United States Patent [19]

Kaczur et al.

[11] Patent Number: 5,409,680
[45] Date of Patent: Apr. 25, 1995

[54] PURIFICATION OF AQUEOUS ALKALI METAL CHLORATE SOLUTIONS

[75] Inventors: Jerry J. Kaczur; David W. Cawlfield, both of Cleveland; Julian F. Watson, Delano, all of Tenn.

[73] Assignee: Olin Corporation, Stamford, Conn.

[21] Appl. No.: 214,534

[22] Filed: Mar. 18, 1994

Related U.S. Application Data

[63] Continuation-in-part of Ser. No. 999,419, Dec. 31, 1992, Pat. No. 5,354,435.

[51] Int. Cl.$^6$ .................................................. C01F 1/00
[52] U.S. Cl. .................................. 423/157; 423/164; 423/165; 423/178; 204/95
[58] Field of Search ............... 423/155, 157, 164, 165, 423/178; 204/95, 94

[56] References Cited

U.S. PATENT DOCUMENTS

| | | | |
|---|---|---|---|
| 4,072,472 | 2/1978 | Lukes | 23/297 |
| 4,196,140 | 4/1980 | Lynch | 560/300 |
| 4,207,152 | 6/1980 | Kadija et al. | 204/98 |
| 4,277,447 | 7/1981 | Chambers et al. | 423/165 |
| 4,303,624 | 12/1981 | Dotson et al. | 423/184 |
| 4,308,030 | 12/1981 | Smith et al. | 436/79 |
| 4,336,232 | 6/1982 | Moritz | 423/164 |
| 4,397,720 | 8/1983 | Moore et al. | 204/98 |
| 4,405,418 | 9/1983 | Takemura | 204/95 |
| 4,450,057 | 5/1984 | Kelly | 204/98 |
| 4,481,088 | 11/1984 | Moore et al. | 204/98 |
| 4,515,665 | 5/1985 | Fair et al. | 204/98 |
| 4,702,805 | 10/1987 | Burkell et al. | 204/95 |
| 4,747,917 | 5/1988 | Reynolds | 204/98 |
| 4,830,837 | 5/1989 | Justice et al. | 423/181 |
| 4,966,764 | 10/1990 | Reed et al. | 423/449.5 |
| 5,023,803 | 6/1991 | Loftis et al. | 364/497 |
| 5,082,567 | 1/1992 | Fritts et al. | 210/673 |
| 5,104,500 | 4/1992 | Ruthel | 204/94 |
| 5,108,722 | 4/1992 | Ruthel et al. | 423/179 |
| 5,169,406 | 12/1992 | Tewari | 23/293 R |

FOREIGN PATENT DOCUMENTS

| | | |
|---|---|---|
| 0498484A1 | 1/1992 | European Pat. Off. |
| 1519571 | 1/1977 | United Kingdom |
| 994407 | 2/1983 | U.S.S.R. |

OTHER PUBLICATIONS

H. Maeda & H. Egawa, "Studies of Selective Adsorption Resins XXVI, Removal of Calcium & Magnesium Ions in a Salt Solution with Chelating Resin Containing Aminomethyl–phosphonic Acid Groups", J. Appl. Polym. Sci., vol. 39, No. 7, pp. 1519–1525 (1990).

R. J. Coin, "Brine Treatment" presented at 9th Annual Chlorine/Chlorate Seminar, Oct. 5–7, 1993.

Primary Examiner—John Niebling
Assistant Examiner—Brendan Mee
Attorney, Agent, or Firm—William A. Simons

[57] ABSTRACT

A process for removing alkaline earth metal impurities (e.g. calcium and magnesium ions) from an aqueous alkali metal chlorate solution which includes adding sufficient alkali metal carbonate or hydroxide or both to the impure solution to raise the pH to above 9 and form alkaline earth metal precipitates which are then removed from the pH-adjusted solution (e.g. by microfiltration). This process can lower the level of these impurities from about 1–20 ppm to less than about 0.3 ppm or less.

27 Claims, 3 Drawing Sheets

PURIFICATION OF AQUEOUS ALKALI METAL CHLORATE SOLUTIONS

CROSS-REFERENCE TO RELATED PATENT APPLICATIONS

This application is a continuation-in-part application of U.S. patent application Ser. No. 071999,419, now U.S. Pat. 5,354,435, filed on Dec. 31, 1992 with Jerry J. Kaczur, David W. Cawlfield, Kenneth E. Woodard, Jr., Budd L. Duncan, and Sudhir K. Mendiratta as the named inventors. This parent application is incorporated herein by reference in its entirety.

BACKGROUND OF THE INVENTION

1. Field of the Invention

The present invention is directed to a process for purifying aqueous alkali metal chlorate solutions containing alkaline earth metal-containing impurities. In particular, the present invention is directed to processes for separating and removing alkali earth metal impurities from an aqueous alkali metal (e.g. sodium) chlorate solution using selected precipitation and ion exchange techniques to effect such removal and separation. Furthermore, the present invention is directed to a process for regenerating with chloric acid the ion exchange material used in effecting the alkaline earth metal impurity separation and removal from alkali metal chlorate solutions.

2. Description of Related Art

The purity of the aqueous solution of an alkali metal chlorate feedstock to an electrolytic cell used for producing chloric acid or aqueous mixtures of chloric acid and alkali metal chlorate is an important factor in the long term operation of the electrolytic process. It has also been found that a sodium chlorate feedstock solution which contains substantial amounts of total magnesium and calcium impurities of about 0.5 parts per million (ppm) by wt. or greater may also cause an undesirable voltage rise during the electrolytic cell operation over time. Accordingly, it is desirable to remove these alkaline earth metal impurities from the alkali metal chlorate feedstock solution before the electrolytic cell operation. The present invention provides an answer to this need.

Separately, there are numerous references concerned with the removal of calcium and magnesium impurities from sodium chloride brine. Illustrative of such references are included in the following patents and publications:

U.S. Pat. No. 4,072,472, which issued to Lukes on February, 1978, teaches a process for removal of calcium and sulfate impurities from NaCl subterranean deposits involving insolubilizing the calcium values.

U.S. Pat. No. 4,196,140, which issued to Lynch on Apr. 1, 1980, is directed to a process for recovering chlorine from an aqueous waste stream containing an alkali earth metal halide, alkali earth metal hypohalite, and an alkaline earth metal chlorate. This process involves the following steps:

(1) separating the unpure solution with an alkali metal hydroxide to form a slurry of solid particles of alkaline earth metal hydroxide suspended in a liquid;

(2) separating the alkali earth metal particles-from the liquid; and (3) admixing the liquid with an organic alcohol.

U.S. Pat. No. 4,207,152 which issued to Kadija et al. on Jun. 10, 1980, teaches a process for purifying an alkali metal chloride brine by removing cationic contaminants comprising:

(a) contacting the brine with solid particles of magnesium-containing silicate to cause said cationic contaminants to adhere to the magnesium-silicate particles and (b) then separating the resulting solid particles of magnesium-containing silicate having said cationic contaminants adhering thereto from the resulting purified brine.

U.S. Pat. No. 4,277,447, which issued to Chambers et al. on Jul. 7, 1981, teaches a process for reducing calcium in concentration from alkali metal chloride brines containing an alkali metal hydroxide comprising:

(1) admixing an alkali metal bicarbonate with the alkaline brine to form an insoluble calcium salt;

(2) removing the insoluble calcium salt from the brine; and (3) recovering a purified alkali metal chlorine brine having reduced calcium ion concentration. The purified alkali metal chloride brine having a calcium ion concentration from about 0.5 to about 2.0 parts per million by weight.

U.S. Pat. No. 4,303,624, which issued to Dotson et al. on Dec. 1, 1981, is directed to a method of purifying alkali metal chloride brine containing calcium ion impurities for introduction into a electrolytic cell comprising:

(a) adding an alkali metal oxalate compound to said brine to form an insoluble calcium oxalate compound;

(b) separating said insoluble oxalate precipitate from said brine to purify said brine;

(c) recovering the resulting purified brine; and (d) contacting said purifying brine with an ion exchange resin to further reduce the content of calcium ions in said purified brine.

U.S. Pat. No. 4,308,030, which issued to Smith et al. on Dec. 29, 1981, claims a method for determining low level concentrations of alkaline earth metals in a concentrated aqueous alkali metal chloride brine.

U.S. Pat. No. 4,397,720, which issued to Moore et al. on Aug. 9, 1983, is directed to an improved process for purifying an alkali metal halide brine liquor comprising:

(a) collecting an impure alkali metal halide solution containing halates and hypohalites therein; and (b) contacting the collected solution with at least a stoichiometric amount of an acid and an aldehyde to reduce substantially all of the alkali metal hypohalite and halate within said solution to halogen and alkali metal halide.

U.S. Pat. No. 4,450,057, which issued to Kelly on May 22, 1984, is directed to a process for removing dissolved aluminum and silica impurities from an alkali metal halide brine comprising:

(a) adjusting the pH of said purified brine to between about 2.0 and about 3.0;

(b) contacting said brine with a strong macroreticular cationic chelating resin to remove said dissolved aluminum and silica therefrom; and (c) separating the purified brine from the resin.

The patent also teaches regeneration of chelating by (d) washing the resin with a mineral acid to remove said dissolved aluminum and silica therefrom and (e) washing said acidified resin with a caustic solution so that it can absorb positive ions.

U.S. Pat. No. 4,481,088, which issued to Moore et al. on Nov. 6, 1984, is directed to the removal of chlorate ions from a recirculating anolyte brine comprising:

(a) treating a portion of resaturated brine liquor at a temperature of about 90° C. to about 105° C. with at least a stoichiometric amount of hydrochloric acid to reduce essentially all of the alkali metal halate within said portion to halogen and alkali metal halide.

U.S. Pat. No. 4,515,665, which issued to Fair et al. on May 7, 1985, claims a process for stabilizing a complex of metal and silica in an alkali metal halide brine comprising:

(a) adjusting the pH of the brine to a level of between 4 and 12 (preferably by adding an alkali metal hydroxide);

(b) operating an electrolytic membrane cell under certain conditions to maintain the pH of said brine during electrolysis at a value above 3.5.

U.S. Pat. No. 4,702,805, which issued to Burkell et al. on Oct. 27, 1987, is concerned with a continuous process for producing sodium chlorate by the electrolysis of sodium chloride contaminated with sodium sulfate which involves (1) cooling the resulting sodium chlorate liquor to crystallize out a portion of said sodium crystals, thereby providing purified sodium chlorate crystals and a resulting mother liquor containing the sulfate impurities; (2) separating the purified crystals from the mother liquor and (3) recycling to the electrolysis cell.

U.S. Pat. No. 4,747,917, which issued to Reynolds et al. on May 31, 1988, is directed to a process for reducing sulfate ion concentration in an alkali metal halide brine.

U.S. Pat. No. 4,830,837, which issued to Justice et al. on May 16, 1989, is directed to a process for purifying an alkali metal halide brine containing aluminum as an impurity which comprises:

(a) adjusting the pH of the alkali metal halide-brine to 8.5–9.5; and (b) contacting the pH adjusted alkali metal halide brine with an ion exchange resin having a phosphonic acid group.

U.S. Pat. No. 4,966,764, which issued to Reed et al. on Oct. 30, 1990, teaches a process for purifying a dehalogenated alkali metal halide brine containing aluminum impurities.

U.S. Pat. No. 5,023,803, which issued to Loftis et al. on Jun. 11, 1991 teaches a process which controls the amount of excess carbonate added to the alkali metal brine system to substantially remove by precipitation all of the calcium impurity in the brine as a calcium carbonate precipitated flocculent.

U.S. Pat. No. 5,082,567, which issued to Fritts et al. on Jan. 21, 1992, teaches the regeneration of a cationic exchange resin that had been used to remove chlorate ions from an aqueous solution by (1) rinsing the resin with water and (2) contacting the resin with an aqueous acidic sulfite solution.

U.S. Pat. No. 5,104,500, which issued to Ruthel on Apr. 14, 1992, teaches an improved method of producing sodium chlorate crystals comprising:

(a) electrolyzing a sodium chloride brine stream containing calcium impurities in an electrolysis cell to produce sodium chlorate solution;

(b) passing said sodium chlorate into a crystallizer to produce sodium chlorate crystals and a mother liquid containing calcium impurities;

(c) separating the crystals from the mother liquor;

(d) passing at least a portion of said mother liquid through a cationic chelating ion exchange resin column in sodium form;

(e) operating said column so that, on the average, it removes only an amount of calcium equal to the amount of calcium in the brine steam thereby preventing the buildup of calcium therein;

(f) recycling the calcium-depleted mother liquor through the electrolysis cell.

U.S. Pat. No. 5,169,406, which issued to Tewari on Dec. 8, 1992, teaches a process for preparing a sodium chloride brine solution from a sodium chloride salt containing calcium sulfate impurities in a certain apparatus.

European Patent Application, which was filed by Eka Nobel AB on Jan. 24, 1992 and was published on Aug. 12, 1992, teaches a process for electrolytic production of sodium chlorate wherein alkali metal hydroxide co-produced is used for the precipitation of impurities and regeneration of ion-exchange resins in connection with dissolution and purification of technical alkali metal chloride.

Russian Patent Document No. 994407, entitled "Method of Purifying Sodium Chloride Solutions" by K. Z. Rogozovskaya et al., teaches subjecting a sodium chloride solution with a soda-caustic treatment to precipitate out calcium carbonate and magnesium and iron hydroxides.

United Kingdom Patent Specification No. 1,519,571, which was filed by Allied Chemical Corp. on Jan. 5, 1977 and published on Aug. 2, 1978, teaches a process for purifying sodium chloride brine by reacting said brine sequentially with sodium carbonate and sodium hydroxide, removing the precipitating solids, and then recycling a portion of said removed solids to the reaction zone of the starting brine with the sodium carbonate.

H. Maeda and H. Egawa, "Studies of Selective Adsorption Resins XXVI, Removal of Calcium and Magnesium Ions in a Salt Solution with Chelating Resin Containing Aminomethylphosphonic Acid Groups", *J. Appl. Polym. Sci.*, Volume 39, No. 7 pages 1519–25 (1990) teaches the adsorption mechanisms of calcium and magnesium ions from a sodium chloride salt solution onto a selected chelating resin.

R. J. Coin "Brine Treatment" presented at the Ninth Annual Chlorine/Chlorate Seminar on Oct. 5–7, 1993 teaches various processing parameters investigated during the purification of sodium chloride brines.

All of the above references are incorporated herein by reference in their entireties.

In practice, these prior art precipitation processes used in treating alkali metal chloride brine using alkali metal carbonate, alkali metal hydroxides, and mixtures thereof have been able to remove alkaline earth impurities to total alkaline earth metal concentrations of only about 0.5 to 1.5 parts per million by weight. Unexpectedly, it has now been found that alkali metal chlorate solutions behave differently from alkali metal chloride brine solutions such that under specific processing conditions, the amount of alkaline earth metal in these chlorate solutions can be reduced to concentrations significantly lower than 0.5 ppm and actually to concentrations less than 0.1 ppm.

The solubility of calcium and magnesium have been experimentally found to increase with increasing temperature in alkali metal chloride brine solutions. Accordingly, carrying out calcium and magnesium precipitation treatments with an alkali metal chloride brine at elevated temperatures results in more impurities in the brine solution. To the contrary, it has now been found that temperatures from about 30° C.–100° C. do not adversely affect the amount of Ca and Mg precipitation in an alkali metal chlorate solution and in fact help in reducing the amount of chemicals required to achieve low concentrations of calcium and magnesium. Furthermore, such higher temperatures have additional advantages since they increase the rate of reaction and thus decrease the time needed for the precipitation.

BRIEF SUMMARY OF THE INVENTION

Accordingly, one aspect of the present invention is directed to the process for removing alkaline earth metal impurities from an impure aqueous chlorate ion-containing solution having an alkali metal chlorate as the main salt comprising the steps of:

(1) adding a sufficient amount of alkali compound to said chlorate ion-containing solution to adjust the pH of said solution to above about 9 and to cause the precipitation of alkaline earth metal compounds in said solution; said alkali compound selected from an alkali metal carbonate, alkali metal bicarbonate, alkali metal hydroxide, and mixtures thereof; and (2) separating said pH adjusted aqueous alkali chlorate solution from said alkaline earth metal precipitates, thereby forming a first purified alkali metal chlorate solution having less than about 0.3 parts per million by weight of total alkaline earth metal ions.

A second aspect of the present invention is directed to the same process for removing alkaline earth metal impurities from an aqueous alkali metal chlorate solution which further comprises the step of:

(3) contacting said first purified alkali metal chlorate solution with a chelating ion exchange resin to remove further amounts of alkaline earth metal impurities, thereby producing a second purified alkali metal chlorate solution having less than about 0.05 parts per million by weight of total alkaline earth metal ions.

A third aspect of the present invention is directed to the same process, which further comprises the step of:

(4) regenerating said chelating ion exchange resin with chloric acid to remove said alkaline earth metal impurities from said chelating ion exchange resin.

A fourth aspect of the present invention is directed to a process for regenerating a chelating ion exchange resin contaminated with alkaline earth metal impurities, comprising the steps of:

(1) contacting a chelating ion exchange resin contaminated with alkaline earth metal impurities with an aqueous chloric acid solution and removing said impurities from said resin; and (2) then contacting said resin with an aqueous solution selected from the group consisting of (a) water, (b) an alkali metal hydroxide solution, (c) an alkali metal chlorate solution, and (d) mixtures thereof, thereby removing substantially all of the remaining chloric acid from said chelating resin.

A fifth aspect of the present invention is directed to a process for removing alkaline earth metal impurities from an impure aqueous chlorate ion-containing solution having an alkali metal chlorate as the main salt, comprising the steps of:

(1) contacting said impure aqueous chlorate ion-containing solution with a chelating ion exchange resin, thereby producing a purified alkali metal chlorate solution having less than about 0.3 parts per million parts by weight of total alkaline earth metal impurities and leaving said alkaline earth metal impurities on said chelating resin; and (2) regenerating said Chelating resin with an aqueous chloric acid solution to remove said alkaline earth metal impurities from said resin.

A sixth aspect of the present invention is directed to a process for producing aqueous chloric acid solutions comprising the step of:

(1) passing a purified aqueous alkali metal chlorate solution having less than about 0.3 parts per million parts by weight of total alkaline earth metal impurities therein through an electrolytic cell having a cation exchange membrane to produce an aqueous solutions containing chloric acid and an aqueous solution having alkali metal hydroxide.

All aspects of this invention may be run as continuous or batch processes.

DESCRIPTION OF PREFERRED EMBODIMENTS

The expression "impure aqueous chlorate ion-containing solution having an alkali metal chlorate as the main salt" as used in the present specification and claims means any aqueous solution wherein an alkali metal chlorate or mixture of chlorates is the principal salt or salts therein along with an impurity level of one or more alkaline earth metal ions. Such aqueous solutions would include aqueous solutions having only an alkali metal chlorate as the only salt therein (e.g., an aqueous sodium chlorate solution) or aqueous solutions containing a mixture of chloric acid and an alkali metal chlorate (e.g., aqueous chloric acid/sodium chlorate solutions) or an aqueous solution of alkali metal chlorate which may contain substantial amounts of other alkali metal compounds such as sulfate, chloride, perchlorate, and phosphate wherein chlorate is the major anion. The processes of the present invention would remove alkaline earth metal impurities from such aqueous solutions. The alkaline earth metals include calcium. (Ca), magnesium (Mg), strontium (Sr), and barium (Ba).

The preferred impure aqueous chlorate ion-containing solution is an impure aqueous solution of a single alkali metal chlorate. The most preferred impure aqueous chlorate ion-containing solution is an impure aqueous sodium chlorate solution.

For purposes of explaining this invention, the following description will be directed toward treating an aqueous sodium chlorate solution.

Figure 1:
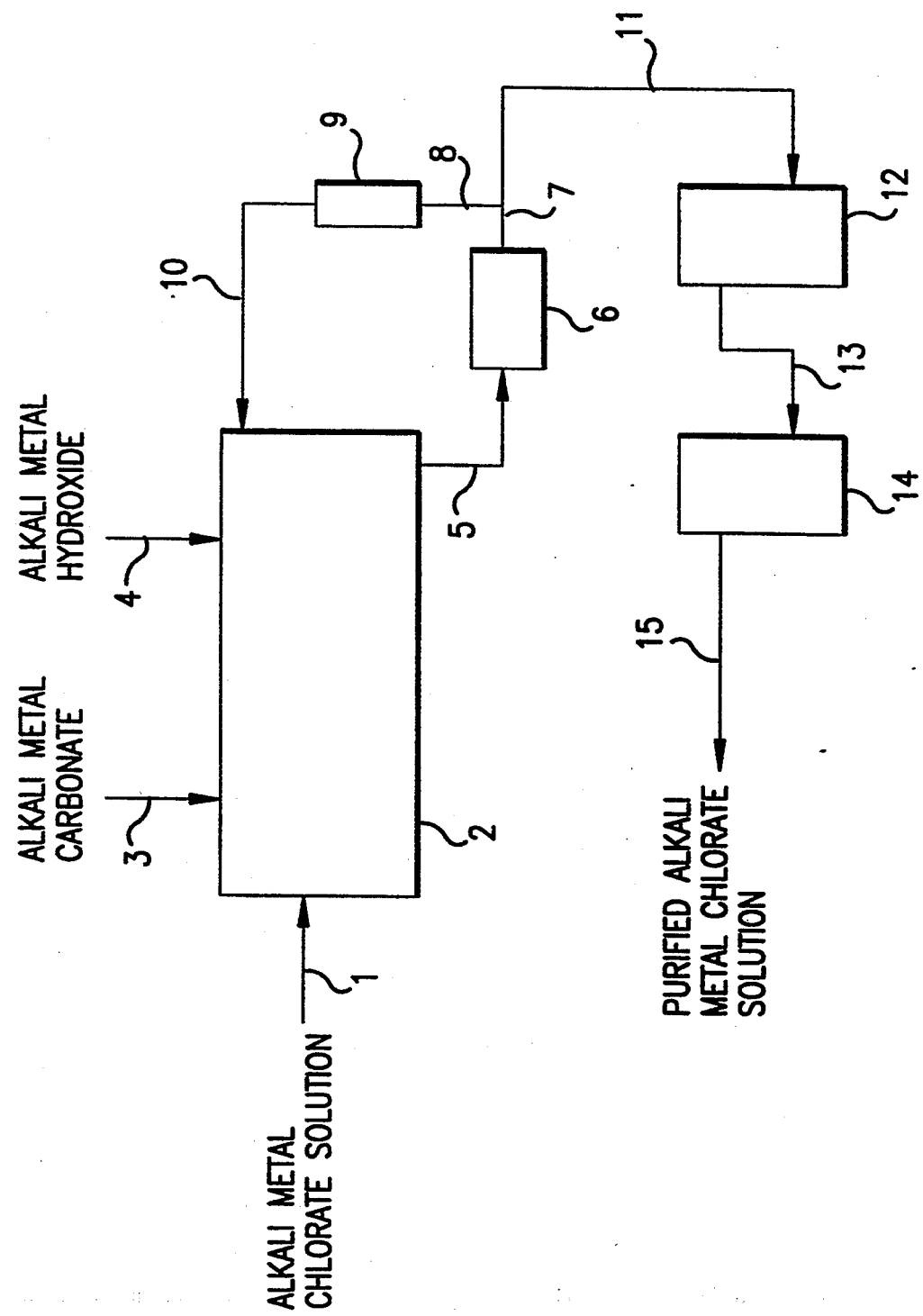
FIG. 1 is a flow chart describing a preferred alkali metal carbonate/alkali metal hydroxide treatment followed by microfiltration.

A sodium chlorate solution is preferably prepared from suitable commercially available chlorate crystal with reasonably good quality water with low hardness and low amounts of other alkali metal salts of chloride, sulfate, phosphate, and other anions. The sodium chlorate solution concentration is between 10 wt % to saturation at temperatures between 5° C. to 100° C., more preferably 15–60 wt %, and more preferably between 20–55 wt %. As shown in FIG. 1, the solution goes through feed line 1 into treatment tank 2 where it is treated. Treatment tank 2 has a mixing means such as pump 6 and a heating means such as heat exchanger 9 to heat the solution in the tank. In the preferred mode, the pH of the starting sodium chlorate solution is above a pH of about 5 or greater. If the pH is lower, an alkali metal hydroxide may be added to the solution to raise the pH to above a pH of about 5. The sodium chlorate solution is maintained in tank 2 at a temperature of between 30° C. to 100° C., more preferably between 35° C. to 80° C., more preferably 40° C. to 70° C.

An alkali metal carbonate solution is then added to the solution in tank 2 through line 3 to achieve a sodium carbonate solids basis content of 0.1–50 gm/L in the sodium chlorate solution volume in the tank. The carbonate is more preferably added in excess of the molar quantity required to precipitate calcium as calcium carbonate and magnesium as magnesium carbonate according to the hardness analysis of the sodium chlorate solution. The solution is mixed for a period of at least 15 minutes, preferably at least 30 minutes before the addition of alkali metal hydroxide (preferably sodium hydroxide) through line 4 into treatment tank 2. The hydroxide is added to obtain a final solution pH of from about 9 to 13, more preferably about 9.5 to 13.5, and most preferred from about 10 to 12. The alkali hydroxide and alkaline pH is believed to precipitate a very insoluble magnesium hydroxide precipitate onto calcium carbonate and possibly small amounts of magnesium carbonate already precipitated in the solution after the carbonate addition. This chemical precipitation process also removes transition metal impurities, including iron, nickel, cobalt, copper, and zinc among others as insoluble hydroxides that are removed with the alkaline earth metal precipitates upon filtration or the like. The addition procedure can be reversed, such that the hydroxide is added to the solution to adjust pH initially, followed by the carbonate solution addition. But the carbonate followed by hydroxide addition is more preferred. A premixed carbonate-sodium hydroxide solution can also be added to the sodium carbonate solution. The treated solution may be recycled from existing treatment tank 2 by line 5 into pumping means 6 where it is mixed. The solution may be kept at the desired temperature by passing through lines 7 and 8 and heat exchanger 9 and back into tank 2 through line 10 for a period of at least 15 minutes, more preferably 30 minutes or more. This mixing and heating after the carbonate-sodium hydroxide addition may last from 30 minutes to 720 minutes. Warm temperatures in the range of 30° C.–100° help in the formation of a larger particle size floc of insoluble calcium and magnesium carbonate/hydroxide compounds in the chlorate solution.

The solution is then drawn through line 7 into line 11 into a microfiltration system consisting of filters 12 and 14 and transfer lines 13 and 15. Filter 12 is a pre-filter to filter out the bulk amount of the precipitated hardness, i.e., calcium and magnesium floc. Preferred is a high capacity filter with a nominal micron retention rating of less then 10 microns, preferably less than 5 microns, and more preferably less than 3 microns. Bag type filters are especially suitable for this purpose although other filter types are also suitable for this purpose and are easily selected from those readily available in the marketplace and those skilled in filtration art. Filter 14 is preferably a filter with an absolute micron particle retention rating to filter out colloidal size hardness particles not captured or that pass through filter 12. The absolute micron rating of filter 14 is 1 micron or less, preferably 0.8 microns or less, and more preferably 0.5 microns or less. Without the removal of these colloidal particles, hardness concentrations in the purified chlorate solution of less than about 1 ppm, and especially below 0.5 ppm cannot be easily or consistently achieved. The microfiltration system may consist of only the 1 micron absolute or less filter or filter 14, but it is especially more economical to employ the one or more pre-filter 12 as shown in FIG. 1.

Figure 2:
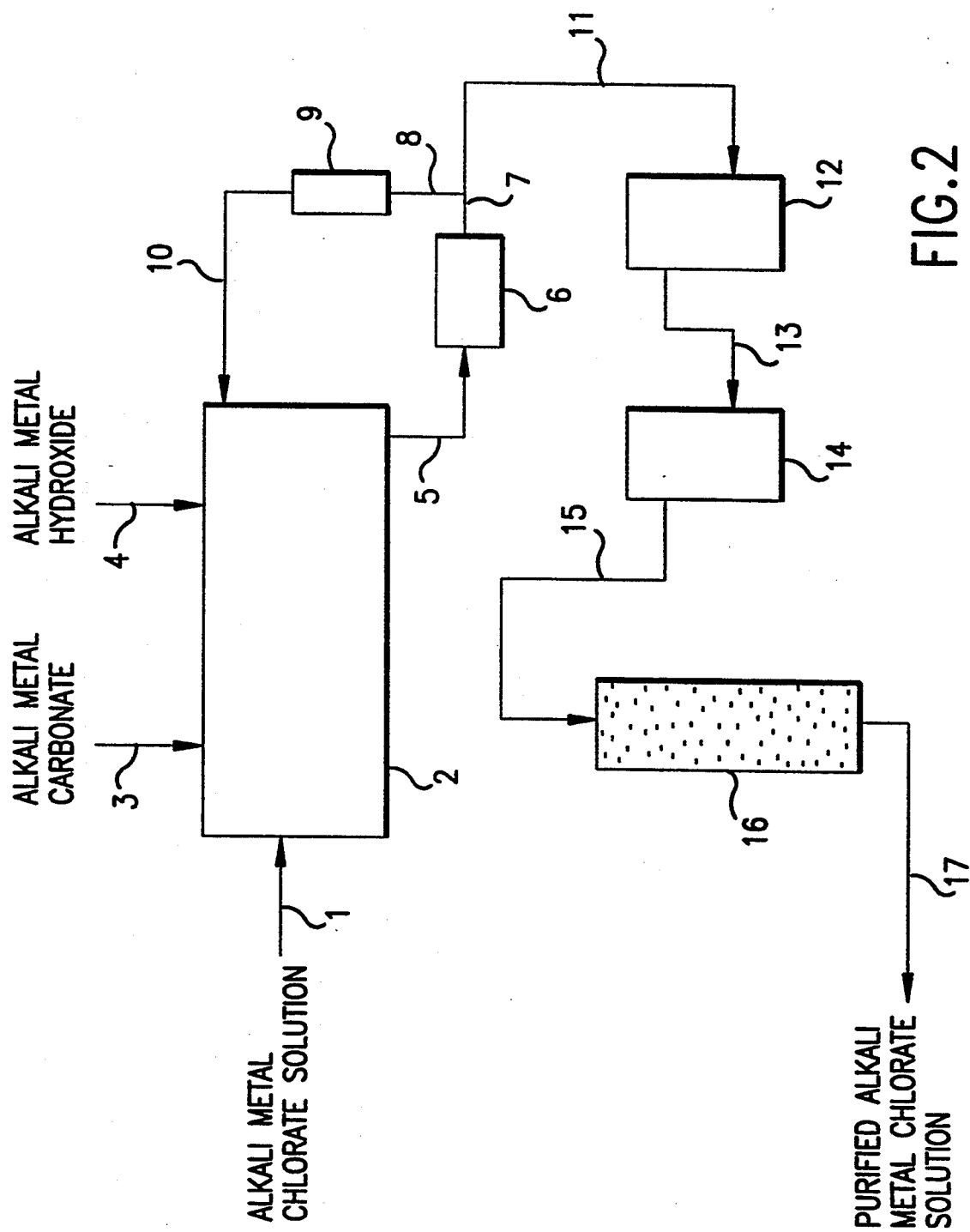
FIG. 2 is a flow chart describing a preferred alkali metal carbonate/alkali metal hydroxide treatment and microfiltration followed by passing the pH-adjusted alkali metal chlorate solution through a chelating ion exchange resin bed.

FIG. 2 shows a process using the previously described carbonate/hydroxide chemical pretreatment process followed by the microfiltration now followed by passing the pH adjusted (appropriate pH range for maximum removal efficiency of alkaline earth metals and transition metals by the particular resin employed) solution through transfer line 15 and a chelating ion exchange resin column or bed. Any conventional processing technique involving chelating ion exchange resins may be used here. Any chelating ion exchange resin generally used for removing alkaline earth metal impurities from an aqueous solution may be used in the present invention. Generally, chelating resins are ion exchange resins which have a chelate-forming group that can selectively capture poly valent ions by chelate bonding. The chelate group contains more than one electron-donor element such as nitrogen (N), sulfur (S), oxygen (O), or phosphorus (P) and can be combined or arranged in the form of N—N, O—O, S—N, and N—O as examples. These chelating groups are generally attached or bonded to a three-dimensional porous structure or matrix. Chelating functionality groups include iminodiacetone, polyamine, and aminomethylphosphonic groups. The chemical precipitation pretreatment steps with carbonate/hydroxide may not be needed if the hardness of the initial impure sodium chlorate solution is less than about 10 ppm total calcium and magnesium. Generally, the preferred mode is to have the chemical precipitation to reduce the hardness and transition metal cation load of the chlorate solution before feeding it to the ion exchange column to provide for economical operation. After treatment in chelating ion exchange resin column or bed 16, the further purified aqueous sodium chlorate solution exists by transfer line 17 for further use in electrolytic applications (not shown).

Figure 3:
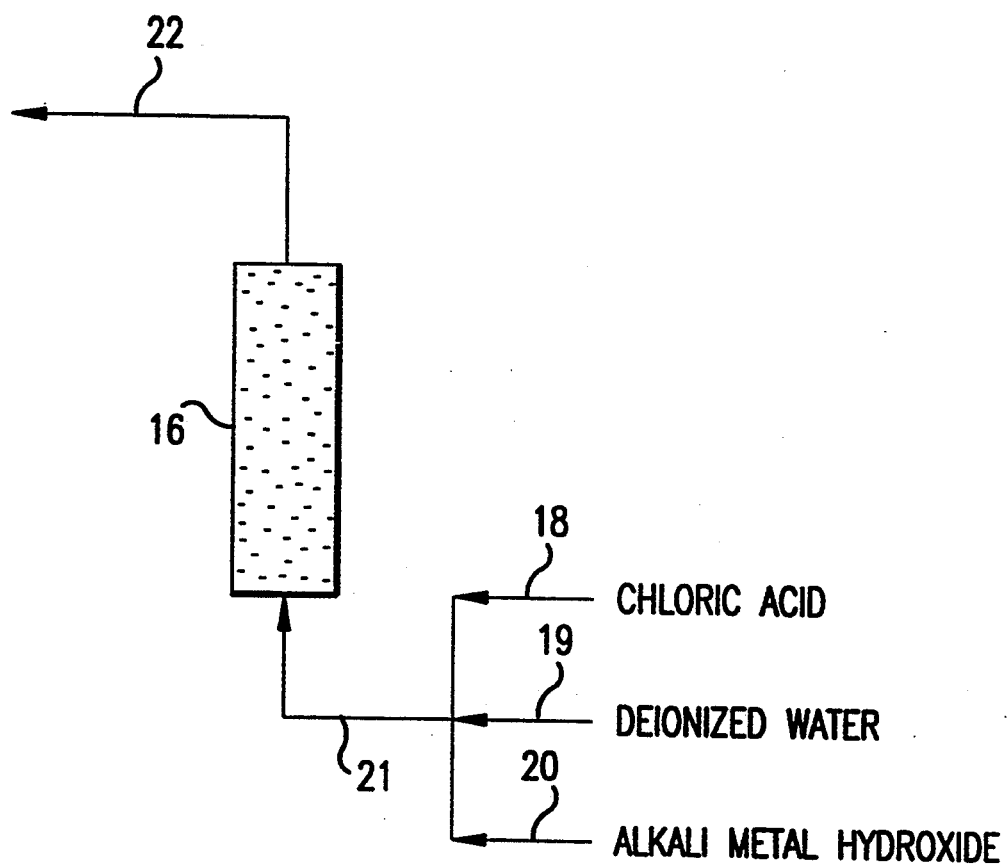
FIG. 3 is a flow chart showing the regeneration chelating ion exchange resin column with a set of three streams that are sequentially passed through the ion exchange column to regenerate it.

FIG. 3 shows the regeneration of the chelating ion exchange resin column or bed 16 with a set of three streams that are sequentially passed through the ion exchange column to regenerate it. The regeneration process sequence is a chloric acid wash through lines 18 and 21, followed by either an optional deionized water rinse through lines 19 and 21 or the combination of an optional alkali metal hydroxide wash through lines 20 and 21, followed by optional deionized water rinse through lines 19 and 21 to rinse off the excess alkali metal hydroxide before using the bed or column to purify another sodium chlorate solution. Optionally, it may be desirable to use a purified sodium chlorate solution in place of the alkali metal hydroxide. The novel use of using chloric acid as the acid regenerant in the ion exchange regeneration scheme is that the final effluent product is sodium chlorate when both the chloric acid and sodium hydroxide are mixed or combined back together again after leaving the bed or column 16 by transfer line 22. This combined effluent stream can then be sent back to the preparation of the alkali metal chlorate solution without creating any waste effluent. The chloric acid concentration for regeneration is in a range of 0.5 wt % to 20 wt %, or more preferred 1 wt % to 15 wt %, and most preferred 2 wt % to 10 wt %. The same ranges are suitable for the sodium hydroxide. The temperature of the solutions for the ion exchange regeneration are preferred to be between about 5° C. to 80° C. and more preferred to be between 10° C. to 60° C. The use of lower temperatures and lower chloric acid concentrations during the regeneration are preferred to reduce the extent of potential oxidation of the chelating ion exchange resin. Oxidation resistant chelating ion exchange resins are preferred. We have found that the extent of oxidation of some chelating resins with an 18% chloric acid at room temperature is very slow. The amount of chloric acid that contacts the chelating ion exchange resin should be sufficient to remove substantially all (i.e., at least about 99% by weight) of the alkaline earth metal impurities from the resin.

The following examples are recited to further illustrate the present invention. All parts and percentages are by weight and all temperatures are in degrees Celsius unless explicitly stated otherwise.

EXAMPLES 1–3

Carbonate/Caustic/Microfiltration Experiments

A series of experimental bench scale tests were conducted to determine the parameters for developing a hardness removal process employing sodium carbonate addition, pH adjustment with NaOH, and followed by micro-filtration to obtain sodium chlorate product solutions with a total Ca and Mg hardness of preferably less than about 0.5 ppm, thus making it especially suitable as a feed for electrochemical membrane based sodium chlorate salt-splitting processes. The raw sodium chlorate solution feedstocks were prepared from commercial sodium chlorate crystal or obtained from a commercial chlorine dioxide process preparing a sodium chlorate feedstock from water containing hardness impurities.

EXAMPLE 1A

Table I gives the results of the first set of tests treating a commercial 50 wt % sodium chlorate solution obtained from a pulp and paper mill containing about 1.3 wt % NaCl. About 4 liters of the sodium chlorate solution was put in a stirred glass vessel at room temperature (25° C.). About 4 grams of sodium carbonate was added to the solution to obtain a 3 gpl concentration of sodium carbonate and mixed for 30 minutes. Then 700 ml sample aliquots of the mixed solution were taken and put into six separate 1 liter beakers on magnetic stirrers. The chlorate solution in each beaker was adjusted to various pH values by the addition of 50 wt % NaOH. After NaOH addition, the beakers were stirred for 30 minutes and then filtered through a 47 mm Poretics Corp. (Livermore, Calif.) 0.2 micron absolute rated polycarbonate microfiltration membrane.

Table I below gives the measured calcium and magnesium concentrations of the feed and microfiltered product solutions in ppm. Samples of the microfiltered sodium chlorate solutions were analyzed using a HACH Company (Loveland, Colo.) total hardness analysis colorimetric kit with a Calmagite indicator and by a Perkin Elmer ICPES (Inductively Coupled Plasma Emission Spectroscopy) unit. The pH 6.64 sample is the raw sodium chlorate solution without sodium carbonate addition. The microfiltered chlorate solution total hardness was reduced to a minimum at an adjusted pH between about 11.50 to 12.00 in this set of tests. The total Ca and Mg was reduced to a minimum of about 0.73 ppm at a pH of 11.50 at this sodium carbonate treatment concentration. The magnesium concentration was reduced to below detection at pH values at a pH of about 11.50 or greater. Discrepancies between the HACH hardness analysis and the ICPES were due to carbonate interference in the HACH analysis where the samples had to be carefully acidified to remove excess carbonate and then made alkaline with ammonium hydroxide and then pH buffered to 11.0 in order for the colorimetric reagent to properly react. This procedure was improved in test set #1C.

TABLE I

| Sodium Chlorate Solution Adjusted pH With NaOH | Total Hardness Using HACH Test Kit in ppm as Ca | ICPES Analysis | |
|---|---|---|---|
| | | Mg ppm | Ca ppm |
| 6.64 (No Na2CO3) | 8.0 | 1.49 | 5.35 |
| 10.22 (with Na2CO3) | 5.4 | NA | NA |
| 11.04 | 3.2 | 0.28 | 1.20 |
| 11.50 | 4.0 | <0.1 | 0.73 |
| 12.00 | 2.8 | <0.1 | 1.00 |
| 12.30 | <0.4 | 0.4 | 1.18 |
| 12.49 | 0.8 | <0.1 | 2.21 |
| 12.60 | 0.7 | <0.1 | 2.97 |

N.A. = Not Analyzed

EXAMPLE 1B

Table II gives a second set of tests conducted with the same feedstock solution and in the same manner as test set #1A except that the sodium carbonate addition was increased to a 5 gpl concentration in the chlorate solution. Results were similar to test set #1A with the lowest Ca and Mg total hardness being obtained at a pH in the 11–12 pH range. The total Ca and Mg was reduced to a minimum of about 1.14 ppm at a pH of 12.17 at this sodium carbonate treatment concentration. The magnesium concentration was reduced to below detection at pH values of about 11.57 or greater. Discrepancies between the HACH hardness analysis and the ICPES were due to carbonate interference in the HACH analysis where the samples had to be carefully acidified to remove excess carbonate and then made alkaline with ammonium hydroxide and then pH buffered to 11.0 in order for the colorimetric reagent to properly react. This procedure was improved in test set #1C.

TABLE II

| Sodium Chlorate Solution pH | NaOH Addition Equivalent in gpl | Total Hardness Using HACH Test Kit in ppm as Ca | ICPES Analysis | |
|---|---|---|---|---|
| | | | Mg ppm | Ca ppm |
| 10.28 (with Na2CO3) | - 0 - | 2.9 | 1.28 | 1.09 |
| 10.67 | 0.08 | 1.1 | 0.84 | 1.01 |
| 11.15 | 0.20 | 0.5 | 0.17 | 1.04 |
| 11.57 | 0.55 | 0.4 | <0.1 | 1.14 |
| 12.17 | 2.35 | 0.4 | <0.1 | 1.25 |

TABLE II-continued

| Sodium Chlorate Solution pH | NaOH Addition Equivalent in gpl | Total Hardness Using HACH Test Kit in ppm as Ca | ICPES Analysis Mg ppm | ICPES Analysis Ca ppm |
|---|---|---|---|---|
| 12.53 | 6.50 | <0.4 | <0.1 | 1.65 |

EXAMPLE 1C

Table III gives the data results on a third set of tests conducted with the same sodium chlorate feedstock solution and in the same manner as test set #1A and #1B except that the sodium carbonate addition was further increased to a 10 gpl concentration in the chlorate solution. This test set shows that the carbonate concentration was not sufficient for adequate calcium precipitation in test sets #1A and #1B. The magnesium concentration was reduced to below detection limits in the samples above a pH of about 11 or higher and the calcium concentration was reduced to about 0.40 ppm or lower at pH values of 11.0 or greater.

TABLE III

| Sodium Chlorate Solution Adjusted pH With NaOH | NaOH Addition Equivalent in gpl | Total Hardness Using HACH Test Kit in ppm as CA | ICPES Analysis Mg ppm | ICPES Analysis Ca ppm |
|---|---|---|---|---|
| 10.43 (With $Na_2O_3$) | 0 | <0.4 | 0.41 | 0.54 |
| 11.14 | 0.2 | <0.4 | <0.10 | 0.41 |
| 11.63 | 0.5 | <0.4 | <0.10 | 0.41 |
| 12.01 | 1.0 | <0.4 | <0.10 | 0.39 |
| 12.23 | 1.6 | <0.4 | <0.10 | 0.35 |
| 12.48 | 2.8 | <0.4 | <0.10 | 0.33 |

EXAMPLE 1D

Table IV gives a fourth set of tests conducted with a similar sodium chlorate feedstock solution and in the same manner as test sets #1A, #1B, and #1C except that the sodium carbonate addition was further increased to a 15 gpl concentration in the chlorate solution and with the solution temperature maintained warm at 55° C. during the carbonate and NaOH additions. This test set demonstrates that a sodium chlorate production solution can be successfully treated by this precipitation procedure followed by microfiltration to achieve Ca and Mg hardness content concentrations of less than 0.10 ppm. Temperature and mixing time was found to be especially important in obtaining low hardness microfiltered sodium chlorate product solutions such that the sodium carbonate addition could be significantly reduced. This is demonstrated in Example Set 2.

TABLE IV

| Sodium Chlorate Solution Adjusted pH With NaOH | NaOH Addition Equivalent in gpl | Total Hardness Using HACH Test Kit in ppm as Ca | ICPES Analysis Mg ppm | ICPES Analysis Ca ppm |
|---|---|---|---|---|
| 6.50 | 0 | 5.2 | 0.68 | 2.60 |
| 9.96 (w/$Na_2CO_3$) | 0 | <0.4 | <0.10 | <0.10 |
| 10.56 | 0.12 | <0.4 | <0.10 | <0.10 |
| 11.45 | 0.42 | <0.4 | <0.10 | <0.10 |
| 11.62 | 0.60 | <0.4 | <0.10 | <0.10 |
| 11.75 | 0.92 | <0.4 | <0.10 | <0.10 |
| 11.94 | 1.25 | <0.4 | <0.10 | <0.10 |

EXAMPLE 2

In this example, a precipitation process employing sodium carbonate addition, pH adjustment with NaOH, and then followed by a microfiltration procedure was used to obtain commercial quantities of purified sodium chlorate product solution with a total Ca and Mg hardness of less than 0.10 ppm that is especially suitable as a feed for electrochemical membrane based salt-splitting processes.

Approximately 3900 gallons (approximately 44,000 lbs) of a 48 wt % sodium chlorate solution was obtained from a commercial pulp and paper mill chlorine dioxide generator system prepared from commercial Eka Nobel sodium chlorate crystal dissolved in untreated process water containing a significant hardness content. The sodium chlorate solution pH was about 6.0. The solution was pumped into a 6000 gallon treatment/storage tank containing about a 500 gallon heal of previously treated sodium chlorate solution containing calcium and magnesium carbonates and hydroxides with other precipitates. The residual precipitates in the tank heel was used purposely as a seed for the formation of the large size precipitates during the precipitation process. The chlorate solution in the tank was maintained at about 50° C. with a continuously operating circulation pump and heat exchanger. A 25 wt % solution of sodium carbonate was then pumped into the tank to add about 160 lb of sodium carbonate to the chlorate solution in the tank, an application rate of about 5 gpl of sodium carbonate to the solution. After about 30 minutes, about 7.8 lbs of 50 wt % NaOH was added into the tank to adjust the pH of the final solution in the tank to about 11.3.

After about one hour of mixing after the chemical additions, the alkaline sodium chlorate solution with formed precipitates was then filtered through a bag filter containing a 3M Company Model 523A Liquid Bag Filter having a particle filtration rating of 1.5 microns at 95% retention and 2.5 microns at 99% retention. The solution from the bag filter was then fed into a six element filter housing containing a set of 20 inch length 0.2 micron absolute rated Gelman Sciences SUPORFLOW ® filter cartridges.

Table V below gives the calcium, magnesium, and iron concentrations of the feed and filtered product solutions in ppm. Samples of the filtered sodium chlorate solution were analyzed using a HACH Company (Loveland, Colo.) total hardness analysis colorimetric kit that uses a Calmagite indicator and by ICPES (Inductively Coupled Plasma Emission Spectroscopy). Sample A is the sodium chlorate raw feedstock solution. Sample B was taken after the 0.2 micron filters immediately after the treatment. Sample C was taken 2 days later at the same sample point. The Ca and Mg concentrations were below the detection limits of both analytical methods and demonstrate that less than 0.1 ppm total Ca and Mg can be achieved by this process method on a large scale. The iron concentration in the treated sodium chlorate solution was also reduced to below the detection limit. The chromium (Cr) content of the samples did not significantly decrease because the metal is present as the anion species, chromate $CrO_4^{-2}$ and not as a cationic species Further treatment tests with the same system were conducted successfully by the addition of a premixed solution of NaOH and $Na_2CO_3$ instead of separate addition.

TABLE V

| Sample Solution Designation | Total Hardness Using HACH Test Kit in PPM as Ca | ICPES Analysis Ca ppm | ICPES Analysis Mg ppm | ICPES Analysis Fe ppm | ICPES Analysis Cr ppm |
|---|---|---|---|---|---|
| A | 3.5 | 2.59 | 0.59 | 3.70 | 1.27 |
| B | <0.1 | <0.10 | <0.10 | <0.15 | 1.00 |
| C | <0.1 | <0.10 | <0.10 | <0.15 | 1.23 |

EXAMPLE 3

This example demonstrates that the purified sodium chlorate solution is suitable for use in electrochemical processes, especially membrane based, employing a sodium chlorate feedstock.

The purified sodium chlorate solution in Example Set 2 and approximately four similar treated sodium chlorate solution batches were then used in a commercial size 5.6 $m^2$ monopolar electrochemical sodium chlorate salt-splitting cell employing a three compartment cell design to produce a chloric acid-sodium chlorate solution product as well as coproduct sodium hydroxide. The three compartment cell design utilizing a central ion exchange membrane bounded by two cation membranes is described in the assignee's issued U.S. Pat. Nos. 5,084,148, 5,223,103, 5,242,553, and 5,242,554. The 5.6 $m^2$ electrochemical cell was a monopolar cell consisting of 4 cell units in a filter press assembly. The cell was operated continuously for 23 days on the treated sodium chlorate solution feeds at an input flow rate of about 1.9 liters per minute producing a nominal 18 wt % $HClO_3-25$ wt % $NaClO_3$ product solution with a coproduct NaOH concentration of 10% at an operating current density of 4 $KA/m^2$ (400 $ma/cm^2$). The cell voltage after initial start-up remained consistently between about 5.0–5.2 volts with no voltage rise seen with time. A voltage rise with time is indicative of cell ion exchange membrane blinding or resistance increase by hardness or by other impurities present in the sodium chlorate solution.

In addition, only the bag filter as described in Example Set 2 had to be changed per 3900 gallon batch of sodium chlorate solution treated because of captured precipitated solids. The 0.2 micron absolute micro-filtration membranes did not require replacement even after treatment of 6 batches of sodium chlorate solution. This demonstrates that under the conditions of this experiment, the 1.5 micron rated filter of the filter bag was sufficient to achieve a successful filtration of the precipitated impurities.

CHELATING ION EXCHANGE EXPERIMENTS

EXAMPLE 4

This example demonstrates the use of a chloric acid-sodium chlorate solution followed by NaOH to regenerate a chelating ion exchange resin to remove calcium and magnesium hardness as well as other soluble cation transition metals from a sodium chlorate solution containing significant hardness and metallic cation impurities.

About a 200 $cm^3$ volume of a cross-linked polystyrene backbone matrix chelating ion exchange resin having iminodiacetate functionality groups, Diaion® CR10 made by Mitsubishi Chemical Industries, was transferred into a laboratory ion exchange column having a 0.75 inch diameter and 36 inch length. The ion exchange resin in the column was first regenerated using a downward flow acid wash consisting of an 8 wt % chloric acid-8 wt % sodium chlorate solution to strip metals and hardness followed by a deionized water rinse. The resin was then converted to the sodium form with an upflow of 8% NaOH followed by a deionized water rinse. The upflow is required because the resin swells from conversion from the hydrogen form to the sodium form of the resin. No chlorine dioxide was noted in the chloric acid-sodium chlorate acid wash step liquid effluent. This demonstrates the low reactivity of chloric acid with the ion exchange resin.

A 45 liter solution of sodium chlorate was obtained from a commercial pulp mill chlorine dioxide generator system prepared from commercial Eka Nobel sodium chlorate crystal dissolved in untreated process water containing a significant hardness content and having a pH of about 6.5. This solution was designated as Solution A. Sodium chlorate solution A was then pH adjusted with NaOH to a pH of about 11.0 with the addition of NaOH at an equivalent NaOH concentration of about 0.16 gpl NaOH and filtered through a 1 micron nominal rated polypropylene spun filter for solids removal and designated as Solution B. Both the addition of NaOH and the filtration occurred at room temperature (25° C.). Solution B was the filtered solution that was then pumped through the ion exchange column containing the Diaion® CR10 resin at a rate of 50 ml/min for a period of 13 hours for a total solution volume of about 39 liters passed through the 200 $cm^3$ equivalent to about 195 bed volumes. Samples of the treated product solution after the column were periodically taken during the test and analyzed for hardness and several metals. Sample C was taken at 7 hours into the test and Sample D was taken at 13 hours into the test.

Table VI below gives the calcium, magnesium, and iron concentrations of the feed solutions and product solutions in ppm. Analysis of the samples were done by a HACH Company (Loveland, Colo.) total hardness analysis colorimetric kit using a Calmagite indicator and by ICPES (Inductively Coupled Plasma Emission Spectroscopy). The pH adjusted feed solution A passed through the 1 micron nominal filter showed about ⅔ reduction in magnesium, a slight reduction in calcium, and an the iron content to below the detection limit. The ion exchange column processed samples showed Ca and Mg hardness content below the detection limits by both methods. The chromium (Cr) content of the samples did not significantly decrease because the metal is present as the anion species, chromate $CrO_4^{-2}$, and not as a cationic species. Samples C and D were also analyzed by HGAA (Heated Graphite Atomic Absorption) which has a significantly lower detection limit for Ca and Mg. The Ca content of these samples were measured to be between 10 to 15 ppb.

TABLE VI

| Sample Solution Designation | Total Hardness Using HACH Test Kit in ppm as Ca | ICPES Analysis | | | |
|---|---|---|---|---|---|
| | | Ca ppm | Mg ppm | Fe ppm | Cr ppm |
| A | NA | 3.81 | 1.50 | 2.68 | 1.10 |
| B | NA | 3.51 | 0.56 | <0.15 | 1.01 |
| C | <0.1 | <0.10 | <0.10 | <0.15 | 1.26 |
| D | <0.1 | <0.10 | <0.10 | <0.15 | 0.98 |

NA = Not Analyzed

EXAMPLE 5

In this example, the Diaion ® CR10 chelating resin oxidation stability to chloric acid was qualitatively determined by immersion of 50 cm$^3$ of the resin in an 18 wt % chloric acid—25 wt % sodium chlorate solution at room temperature (25° C.) for 3 weeks in a sealed glass container. An indication of an oxidation reaction of the chloric acid with the resin backbone and functional end group is the formation of chlorine dioxide in the solution phase. No yellow chlorine dioxide coloration in the solution phase was noted after one week. A small amount of light yellow coloration of chlorine dioxide was noted in the solution phase at the end of the three week test period. These qualitative results indicate that chloric acid is not significantly reactive with the functionality groups and backbone structure of this chelating ion exchange resin at ambient temperatures in solutions containing up to about 18 wt % chloric acid. This test is an indication that the ion exchange resin will have a long service for ion exchanging sodium chlorate using dilute chloric acid as a regenerant chemical.

EXAMPLE 6

Three identically constructed electrochemical bench scale cells were constructed consisting of a three compartment design similar to that shown in FIG. 1 in applicant's issued U.S. Pat. Nos. 5,084,148, 5,223,103, 5,248,397, and 5,258,105. The anolyte and catholyte compartments were machined from 1 inch thick natural polyvinylidene difluoride (PVDF). The outside dimensions of both the anolyte and catholyte compartments were 5 inches by 14 inches with machined internal dimensions of 3 inches by 12 inches by 0.250 inches deep. Flow entry and exit ports as well as flow distribution holes were drilled from the outside of the frame to the central recess area for flow into and out of the compartments.

The central ion exchanging compartment was machined from 1 inch thick natural PVDF with outside dimensions of 5 inches by 16 inches to an 0.125 inch by 5 inch by 14 inch thick center area with a central 3 inch by 13 area cutout. The 1 inch by 1 inch top and bottom ends were drilled with a single central hole to form entry/exit ports and tapped to accept ¼ inch NPT pipe thread fittings. A series of 0.055 inch holes were drilled every ½ inch from the central cutout area into the flow distribution hole in the 1 inch by 1 inch entry/exit ends of the ion exchanging compartment frame. These flow distribution holes go through the ⅛ inch thickness of the central part of the frame.

The anolyte compartment was fitted with an Eltech Research TIR-2000 iridium oxide based oxygen evolution anode on an expanded titanium metal base substrate that was 1/16 inch thick by 3 inches wide by 12 inches long. A ½ inch wide by 12 inch long by 1/16 inch thick titanium current distributor strip was welded at multiple points to the backside of the expanded metal anode. Two ½ inch diameter titanium current conductor posts were then welded to the back side of the titanium anode current distributor strip. The anode structure was then mounted into the recess inside the anolyte compartment using one or more layers of 1/16 inch thick expanded polytetrafluorethylene mesh behind the anode to make the anode surface flush with the inside surface of the anolyte compartment.

The catholyte compartment was fitted with a 1/16 inch thick by 3 inch by 12 inch type 316L stainless steel conductor posts welded on the back side. A 60 mesh 316L screen with a 1/16 inch thickness was spot welded to the perforated 316L stainless steel perforated plate to provide a high surface area cathode contact with the adjoining membrane during cell operation. The cathode structure was mounted in the recess inside the catholyte compartment using two layers of 1/16 inch thick expanded polytetrafluorethylene mesh behind the cathode plate to make the cathode surface flush with the inside surface of the catholyte compartment.

The electrochemical cell assembly was completed using 0.040 inch thickness polytetrafluorethylene compressible GORE-TEX ® gasket tape (W. L. Gore & Associates, Elkton, Md.) on the sealing surfaces of all the compartment cell-frames. Two layers of a lose woven polytetrafluorethylene filament with a 1/16 inch thickness were laid in place in the central ion exchange compartment to provide for flow distribution and physical formation of the flow channel. A DuPont NAFION ® 450 perfluorinated sulfonic acid cation permeable type membrane was mounted between the central ion exchange compartment and the anolyte compartment and a NAFION 350 perfluorinated sulfonic acid cation permeable type membrane was mounted between the other central ion exchange compartment face and the catholyte compartment for Cells 1 and 3, Cell 2 was assembled with a DuPont NAFION 324 AND NAFION 417 in the same relative correspondent positions as in Cells 1 and 2.

The above three cells were operated on various treated and untreated 46–48 wt % sodium chlorate solutions at flow rates of about 8–14 gm/min and fed into the bottom of the central ion exchange compartment of the cells to obtain the chloric acid wt % concentrations in the chloric acid-sodium chlorate solution product as listed in Table VII, The untreated sodium chlorate solution was prepared from commercial sodium chlorate crystal that was dissolved in deionized water, Deionized water was metered into the bottom of the catholyte compartment at suitable flow rates between about 8–14 gm/min to achieve consistent concentrations of NaOH product from the catholyte compartment as also shown in Table VII, The catholyte circulation was set-up with a self-driven circulation loop using gas lift from the generated hydrogen gas, The anolyte compartment of each cell was started up with a 30 wt % sulfuric acid which was recirculated by a pump through a water-cooled glass heat exchanger with temperature control to hold the cell anolyte solution temperature to a maximum temperature of about 55° C., Deionized water was metered into the anolyte compartment at a rate sufficient to control the acid concentration in the anolyte to about a 30 wt % equivalent as sulfuric acid by acid-base titration.

The cells were operated continuously at a current of 93 amperes and current density of 4KA/m$^2$, The cell voltage and product solution concentrations Were measured daily with the solution input flows to each cell adjusted as needed to meet the operation criteria, The long term cell operation voltage results are summarized in Table VII below:

TABLE VII

| Cell No. | Sodium Chlorate Feedstock & Impurities | Cell Product Concentrations | Cell Operation Comments |
|---|---|---|---|
| 1 | 0.3-0.4 ppm Ca/Mg total hardness content (Major hardness component was Ca) | 18 wt % chloric acid; 10-12 wt % NaOH | Cell voltage increased from 5.6 volts to 5.9 volts after 18 days of operation. Cell voltage increased to 6.1 volts after 44 days of operation. Cell voltage increased to 6.4 volts after 64 days of operation. |
| 2 | Untreated sodium chlorate feed: 2-4 ppm; Ca/Mg total hardness | 12 wt % chloric acid; 10 wt % NaOH | Cell voltage increased from 5.4 volts to 7.34 volts in 8 days. |
| 3 | Treated sodium chlorate having <0.1 ppm total Ca/Mg produced in commercial system as described in Example 3 | 18 wt % chloric acid; 10-12 wt % NaOH | No change in cell voltage after 18 days of operation. |

These results clearly demonstrate that even the use of chemically treated sodium chlorate solutions having a total hardness concentration as low as 0.3-0.4 ppm as shown in the results of operating Cell 1 can have a significant long term operating cell voltage increase with time. These voltage increase effects are due to the blinding or precipitation of insoluble calcium, magnesium, strontium, and barium alkaline earth hydroxide/carbonate precipitates in and/or on the membrane adjoining the catholyte compartment when alkali earth hydroxide is produced in that compartment. This effect usually cannot be determined or detected without operating the electrolytic cell system for a sufficient extended period of time. In comparison, Cell 3 using the chemical treatment processed sodium chlorate feedstock having a total hardness level of less than 0.1 ppm showed no significant voltage increase with time.

The chemical treatment process and/or the ion exchange process disclosed in this application can also be used to treat other alkali metal chlorate containing solutions, for example chlorate solutions containing significant amounts of alkali metal sulfates and/or alkali metal chlorides and/or alkali metal perchlorates and the like. Solutions containing sodium chlorate and sodium chloride are typically present in sodium chlorate electrolytic processes that produce commercial sodium chlorate crystal that is used in producing chloric acid-sodium chlorate solution mixtures as taught in the referenced applicant's issued patents. A portion of the sodium chlorate-sodium chloride solutions in the chlorate production process are typically processed by ion exchange to control calcium and magnesium hardness.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for removing alkaline earth metal impurities from an impure aqueous chlorate ion-containing solution having an alkali metal chlorate as the main salt comprising the steps of:
    (1) adding a sufficient amount of at least one alkali compound to said chlorate ion-containing solution to adjust the pH of said solution to about 9.5 to 13.5 and to form alkaline earth metal precipitates in said solution; said alkali compound selected from the group consisting of an alkali metal carbonate, alkali metal bicarbonate, alkali metal hydroxide, and mixtures thereof; and
    (2) separating said pH-adjusted aqueous alkali chlorate solution from said precipitated alkaline earth metal impurities; thereby forming a first purified pH-adjusted aqueous alkali chlorate solution having less than about 0.3 parts per million by weight of total alkaline earth metal impurities.

2. The process of claim 1 wherein said alkali metal chlorate is sodium chlorate.

3. The process of claim 1 wherein sufficient alkali compound is added to raise the pH of said solution to about 10 to about 12.

4. The process of claim 1 wherein said alkali compound is a mixture of alkali metal carbonate and alkali metal hydroxide.

5. The process of claim 4 wherein said alkali metal carbonate is sodium carbonate and said alkali metal hydroxide is sodium hydroxide.

6. The process of claim 5 wherein the amount of sodium carbonate added is in molar excess of the alkaline earth metal impurities present in said chlorate ion-containing solution and the amount of sodium hydroxide added is sufficient to obtain a pH in said chlorate ion-containing solution of about 9.5 to 13.5.

7. The process of claim 6 wherein said sodium carbonate is added before said sodium hydroxide.

8. The process of claim 1 wherein the total alkaline earth metal ions in said aqueous alkali metal chlorate solution before step (1) is from about 1 to about 20 parts per million by weight of said solution.

9. The process of claim 1 wherein said separating step (2) is carried out by microfiltration through a filter having a pore size of less than about 3 microns.

10. The process of claim 1 wherein the total alkaline earth metal ions in said solution after step (2) is less than about 0.1 parts per million by weight of said solution.

11. The process of claim 1 wherein said step (1) is carried out at a temperature from about 30° C. to about 100° C.

12. The process of claim 1 further including the step (3) contacting said first purified alkali metal chlorate solution with a chelating ion exchange resin, thereby producing a second purified alkali metal chlorate solution having less than about 0.05 parts per million parts by weight of total alkaline earth metal impurities.

13. The process of claim 12 further including the step (4) regenerating said chelating ion exchange resin with an aqueous chloric acid solution to remove said alkaline earth metal impurities from said chelating ion exchange resin.

14. A process for regenerating a chelating ion exchange resin contaminated with alkaline earth metal impurities comprising the steps of:
   (1) contacting a chelating ion exchange resin contaminated with alkaline earth metal impurities with an aqueous chloric acid solution and removing said impurities from said resin; and
   (2) then contacting said resin with an aqueous solution selected from the group consisting of (a) water, (b) an alkali metal hydroxide solution, (c) an alkali metal chlorate solution, and (d) mixtures thereof, thereby removing substantially all of the remaining chloric acid from said chelating resin.

15. A process for removing alkaline earth metal impurities from an impure aqueous chlorate ion-containing solution having an alkali metal chlorate as the main salt, comprising the steps of:
   (1) adding a sufficient amount of alkali compound to said chlorate ion-containing solution to adjust the pH of said solution to about 9.5 to 13.5 and to cause the precipitation of alkaline earth metal compounds in said solution; said alkali compound selected from an alkali metal carbonate, alkali metal bicarbonate, alkali metal hydroxide, and mixtures thereof; and
   (2) separating said pH-adjusted aqueous alkali chlorate solution from said alkaline earth metal precipitates, thereby forming a first purified alkali metal chlorate solution having less than about 0.3 parts per million by weight of total alkaline earth metal ions;
   (3) contacting said first purified alkali metal chlorate solution with a chelating ion exchange resin to remove further amounts of alkaline earth metal impurities, thereby forming a second purified alkali metal chlorate solution having less than about 0.05 parts per million parts by weight of total alkaline earth metal impurities; and
   (4) contacting said chelating ion exchange resin which was contaminated with alkaline earth metal impurities from said first alkali metal chlorate solution with an aqueous chloric acid solution and removing said impurities from said resin; and
   (5) then contacting said, resin with an aqueous metal hydroxide solution to remove substantially all of the chloric acid from said resin thereby producing a regenerated resin.

16. The process of claim 15 wherein another portion of said first purified alkali metal chlorate solution contacts said regenerated resin, thereby producing another portion of said second purified alkali metal chlorate solution having less than about 0.05 parts per million parts by weight of total alkaline earth metal impurities.

17. A process for removing alkaline earth metal impurities from an impure aqueous chlorate ion-containing solution having an alkali metal chlorate as the main salt, comprising the steps of:
   (1) contacting said impure aqueous chlorate ion-containing solution with a chelating ion exchange resin, thereby producing a purified alkali metal chlorate solution having less than about 0.3 parts per million parts by weight of total alkaline earth metal impurities and leaving said alkaline earth metal impurities on said chelating resin; and
   (2) regenerating said chelating resin with an aqueous chloric acid solution to remove said alkaline earth metal impurities from said resin.

18. The process of claim 17 wherein said regenerated resin is further contacted with an aqueous solution selected from the group consisting of (a) water, (b) an alkali metal hydroxide solution, (c) an alkali metal chlorate solution, and (d) mixtures thereof; thereby removing substantially all of the remaining chloric acid from said chelating ion exchange resin.

19. A process for producing aqueous chloric acid solutions comprising the step of:
   (1) passing a purified aqueous alkali metal chlorate-containing solution having less than about 0.3 parts per million parts by weight of total alkaline earth metal impurities therein through an electrolytic cell having a cation exchange membrane to produce an aqueous solution containing chloric acid and an aqueous solution containing alkali metal hydroxide.

20. The process of claim 19 wherein the level of alkaline earth metal impurities is less than 0.05 parts per million parts by weight.

21. A process for removing alkaline earth metal impurities from a chelating ion exchange resin comprising: contacting a chelating ion exchange resin contaminated with alkaline earth metal impurities with an aqueous chloric acid solution and then removing said impurities from said resin.

22. The process of claim 1 wherein said impure aqueous chlorate ion-containing solution having an alkali metal chlorate as the main salt is a chlorate ion-containing solution having one or more alkali metal chlorate salts as the only salts therein.

23. The process of claim 22 wherein said chlorate ion-containing solution having one or more alkali metal chlorate salts as the only salts therein is an aqueous solution of sodium chlorate.

24. The process of claim 15 wherein said impure aqueous chlorate ion-containing solution having an alkali metal chlorate as the main salt is a chlorate ion-containing solution having one or more alkali metal chlorate salts as the only salts therein.

25. The process of claim 24 wherein said chlorate ion-containing solution having one or more alkali metal chlorate salts as the only salts therein is an aqueous solution of sodium chlorate.

26. The process of claim 17 wherein said impure aqueous chlorate ion-containing solution having an alkali metal chlorate as the main salt is a chlorate ion-containing solution having one or more alkali metal chlorate salts as the only salts therein.

27. The process of claim 26 wherein said chlorate ion-containing solution having one or more alkali metal chlorate salts as the only salts therein is an aqueous solution of sodium chlorate.

* * * * *